Nov. 4, 1958 G. S. KELLEY ET AL 2,858,668
CONTROL FOR VARIABLE AREA CONVERGENT-DIVERGENT
EXHAUST NOZZLE
Filed Sept. 27, 1952 3 Sheets-Sheet 1

INVENTORS
GEORGE S. KELLEY
WALTER W. MAHNKEN
BY
ATTORNEY

Nov. 4, 1958 G. S. KELLEY ET AL 2,858,668
CONTROL FOR VARIABLE AREA CONVERGENT-DIVERGENT
EXHAUST NOZZLE
Filed Sept. 27, 1952 3 Sheets-Sheet 2

INVENTORS
GEORGE S. KELLEY
WALTER W. MAHNKEN
BY
Victor D. Behn
ATTORNEY

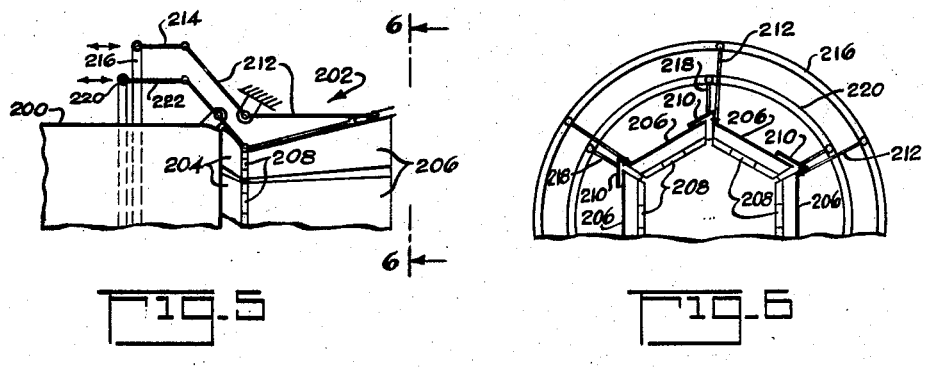

United States Patent Office 2,858,668
Patented Nov. 4, 1958

2,858,668

CONTROL FOR VARIABLE AREA CONVERGENT-DIVERGENT EXHAUST NOZZLE

George S. Kelley, Ridgewood, and Walter W. Mahnken, Union City, N. J., assignors to Curtiss-Wright Corporation, a corporation of Delaware Application September 27, 1952, Serial No. 311,918

1 Claim. (Cl. 60—35.6)

This invention relates to jet engine exhaust nozzles and is particularly directed to means for automatically controlling the exit or discharge area of a nozzle having a downstream divergent portion.

For good fuel economy and engine performance, the exhaust nozzle of aircraft jet engines have been provided with a convergent-divergent profile. Such jet engines are generally operated so that the exhaust gas flow through the divergent portion of the nozzle is supersonic and therefore the pressure of the exhaust gases progessively decreases in a downstream direction along said divergent nozzle portion. An object of the present invention comprises the provision of means for varying the exit or discharge area of a jet engine nozzle having a divergent downstream portion so that the engine exhaust gases expand through said nozzle portion down to approximately the pressure of the surrounding atmosphere. With this arrangement, the forward pressure force or thrust of the jet engine exhaust on the divergent nozzle portion is a maximum. A further object of the invention comprises the combination with a jet engine nozzle having a divergent downstream portion with a variable exit area of means responsive to the exhaust pressure in the divergent nozzle portion and to the pressure of the surrounding atmosphere for controlling the nozzle exit area.

In the case of a jet engine having an exhaust nozzle with a convergent-divergent profile it is known that the minimum or throat area of the nozzle may be made adjustable for optimum or desired engine performance. The specific manner in which said nozzle throat area is varied forms no part of the present invention. For example, in the case of a turbo-jet engine said nozzle throat area may be varied to maintain the turbine rotor at a constant rotational speed. In the case of a ram jet engine, said nozzle throat area may be varied with changes in the flight speed Mach number, with changes in the inlet temperature and/or with changes in the exhaust temperature. As the convergent-divergent nozzle throat area is varied it is necessary to vary the nozzle exit area to maintain the forward thrust force of the engine exhaust gases on the divergent nozzle portion at a maximum value. Accordingly a still further object of the invention comprises the combination with a jet engine convergent-divergent nozzle having variable throat and exit areas of means for automatically varying the nozzle exit area independently of its throat area so that the engine exhaust gases expand through the divergent nozzle portion down to approximately the surrounding atmosphere.

Other objects of the invention will become apparent on reading the annexed detailed description in connection with the drawing in which:

Fig. 5 is a schematic view illustrating a variable area convergent-divergent nozzle having a cross-section which approximates a circular cross-section; and Fig. 6 is an end view taken along line 6—6 of Fig. 5.

Figure 1:
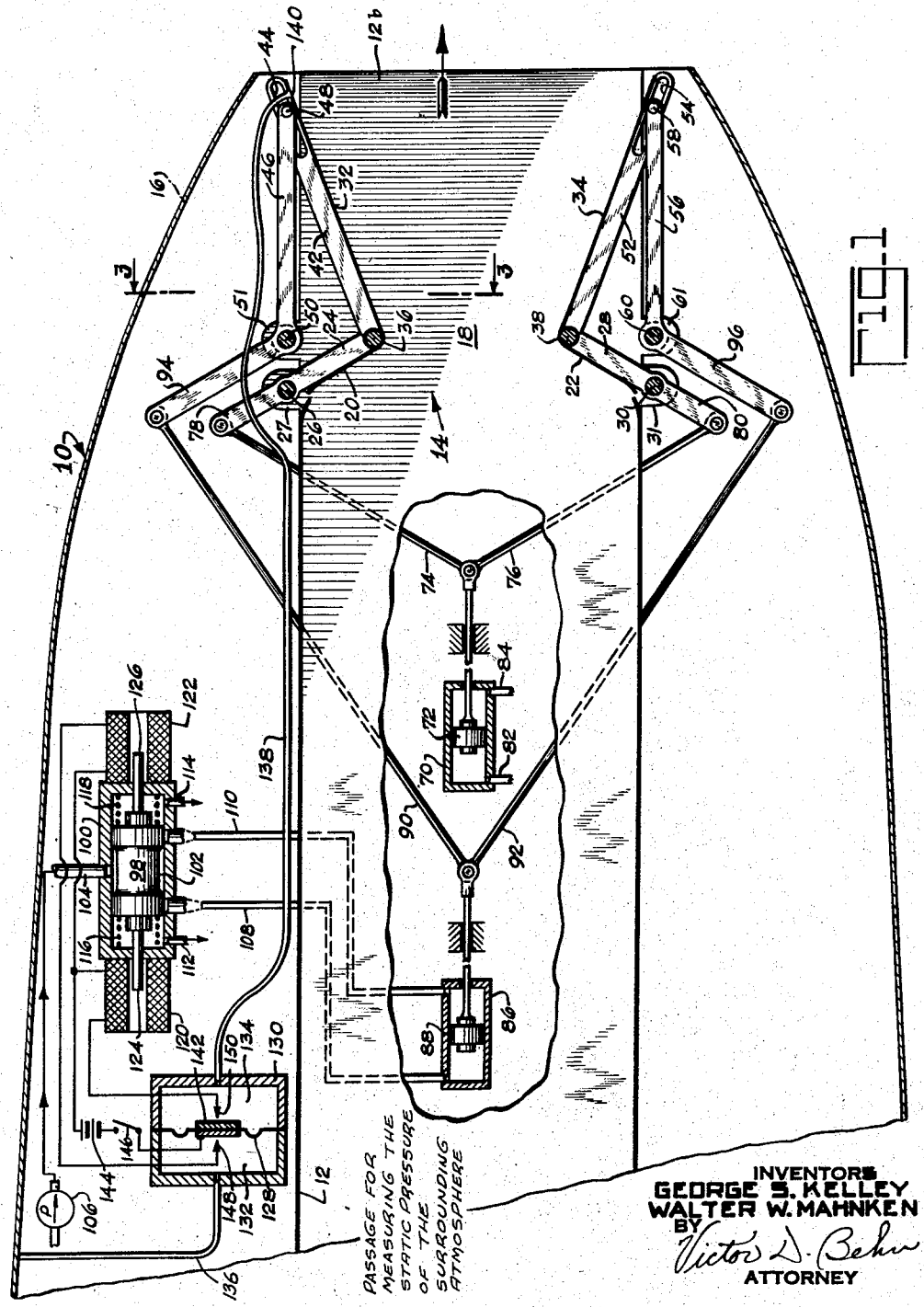
Fig. 1 is a schematic view of the exhaust nozzle portion of a jet engine having a variable area nozzle and nozzle control means embodying the invention.

Referring to the drawing, reference numeral 10 designates the exhaust or discharge end of a jet engine. The end portion 10 of the jet engine comprises a duct 12 having a nozzle 14 at its discharge end through which the exhaust gases discharge rearwardly into the surrounding atmosphere (as indicated by the arrow) to provide the power plant with forward propulsive thrust. At least the discharge end of the duct 12 has a rectangular cross-section as best seen in Fig. 2. As illustrated by dot and dash lines in Fig. 1 a fairing or streamlined housing 16 surrounds the duct 12 and nozzle 14.

As illustrated, the nozzle 14 has a restriction or throat 18 intermediate its ends whereby the upstream portion of the nozzle has a flow passage of converging cross-sectional area and the downstream portion of the nozzle has a flow passage of diverging cross-sectional area. The upstream portion of the nozzle 14 comprises a pair of rectangular plates 20 and 22 disposed on opposite sides of the duct axis with each plate extending from one flat wall 12b of the duct to the opposite flat wall 12c. The nozzle plate 20 has side flanges 24 through which a pivot pin or shaft 26 extends at the upstream edge of said plate to pivotally support said upstream edge from the duct 12, said shaft 26 being supported by ears 27 on the duct 12. Similarly the nozzle plate 22 has side flanges 28 through which a pivot pin or shaft 30 extends at the upstream edge of the plate 22 to pivotally support said upstream plate edge from the duct 12, said shaft 30 being supported by ears 31 on the duct 12. The axes of the pivot pins or shafts 26 and 30 are parallel to each other and are transverse to the axis of the duct 12.

The downstream portion of the nozzle 14 comprises a pair of rectangular plates 32 and 34 disposed on opposite sides of the duct axis with each of said plates also extending between the flat duct walls 12b and 12c. The downstream nozzle plate 32 has a pivotal or hinge connection 36 at its upstream edge to the downstream edge of the upstream nozzle plate 20 and the downstream nozzle plate 34 has a pivotal or hinge connection 38 at its upstream edge to the downstream edge of the upstream nozzle plate 22. The throat 18 of the nozzle is formed by the nozzle plates at the hinge connections 36 and 38, said hinge connections moving with their ends of the nozzle plates 20 and 22.

The downstream nozzle plate 32 has a flange 42 at each side wall 12b and 12c with each said flange having an elongate slot 44 adjacent to its downstream end. Each flange 42 is pivotally and slidably connected to a lever 46 by a pin 48 extending from each lever 46 into the slot 44 of the adjacent flange 42. The levers 46 are pivotally supported on the duct 12. For this purpose the levers 46 may be pivotally supported on the pivot pin or shaft 26 for the upstream end of the nozzle plate 20 or, as illustrated, the levers 46 may be pivotally supported on a separate pivot pin or shaft 50 disposed parallel to the shaft 26 and supported by ears 51 on the duct 12. Similarly the downstream nozzle plate 34 has a flange 52 at each side wall 12b and 12c with each said flange having an elongate slot 54 adjacent to its downstream end. Each flange 52 is pivotally and slidably connected to a lever 56 by a pin 58 extending from each lever 56 into the slot 54 of the adjacent flange 52. The levers 56 are pivotally supported on the duct 12 in a manner similar to the levers 46. Thus, as illustrated, the levers 56 are pivotally supported on a pin or shaft 60 disposed parallel to the shaft 30 and supported by ears 61 on the duct 12.

With the nozzle structure described, the area of the nozzle throat 18 can be varied by pivotally moving or swinging the upstream nozzle plates 20 and 22 about their pivots 26 and 30 respectively. In addition the slidable and pivotal connection of each of the levers 46 and 56 with its respective nozzle plates 32 and 34 permits pivotal movement of said nozzle plates 32 and 34 about their respective hinge connections 36 and 38, in response to pivotal movement of said levers, without producing any movement of the upstream nozzle plates 20 and 22 and without producing any change in the area of the nozzle throat 18. Accordingly the area of the discharge opening of the nozzle 14 can be varied independently of the area of the nozzle throat 18 by moving the levers 46 and 56, said lever movement causing the downstream nozzle plates 32 and 34 only to swing about their hinge connections 36 and 38 with the upstream nozzle plates 20 and 22.

In order to vary the area of the nozzle throat 18, a hydraulic motor 70 is provided. The motor 70 includes a piston 72 having a piston rod to which one end of each of a pair of links 74 and 76 is pivotally connected. The other end of the link 74 is pivotally connected to an extension 78 of the upstream nozzle plate 20. Similarly, the other end of the link 76 is pivotally connected to an extension 80 of the upstream nozzle plate 22. Passages 82 and 84 provide for admission of a fluid under pressure to either end of the motor 70. Supply of a fluid under pressure to the motor 70 through the passage 82 and relief of the pressure in the passage 84 causes the piston 72 to move to the right (Fig. 1) to cause the nozzle plates 20 and 22 to swing inwardly or toward each other to decrease the area of the nozzle throat 18. Similarly admission of a fluid under pressure to the motor 70 through the passage 84 and relief of the pressure in the passage 82 causes opposite movement of the piston thereby causing the nozzle plates 20 and 22 to swing away from each other to increase the area of the nozzle throat 18. Thus the area of the nozzle throat 18 can be regulated by controlling the relief and application of pressure to the fluid motor passages 82 and 84. For reasons of symmetry, two motors 70 preferably are provided on opposite sides of the duct 12.

The specific details of the motor 70 and the specific manner in which the motor 70 is controlled forms no part of the present invention. Thus the manner in which the motor 70 is controlled depends on the nature of the engine 10, the manner in which the engine power and thrust is controlled and on other factors. For example, if the engine 10 is a turbo-jet engine the motor 70 may be controlled so as to vary the area of the nozzle throat 18 to maintain a constant rotational speed of the turbine. In the case of a ram-jet engine the motor 70 may be controlled so as to vary the area of the nozzle throat in a predetermined manner with changes in the flight speed, with changes in the exhaust temperature, and/or with changes in the air inlet temperature.

A second fluid pressure motor 86 is provided for varying the nozzle discharge opening. The motor 86 includes a piston 88 to which one end of each of a pair of links 90 and 92 are connected. The other end of the link 90 is pivotally connected to an arm 94 of the lever 46. The other end of the link 92 is pivotally connected to an arm 96 of the lever 56.

Operation of the motor 86 is under the control of a servo-valve 98. The valve 98 comprises a cylindrical plug slidable in a housing 100 and having an annular groove 102 intermediate its ends. The servo-valve 98 has a fluid pressure supply passage 104 communicating with the annular valve groove 102 and to which a fluid under pressure is arranged to be supplied by a pump 106. The two ends of the valve 98 are arranged to cover outlet passages 108 and 110 which communicate with opposite ends of the fluid motor 86. The two ends of the housing are vented by drain passages 102 and 114. Springs 116 and 118 serve to center the servo-valve 98 in the neutral position illustrated in which both outlet passages 108 and 110 are closed thereby hydraulically locking the motor piston 88 against movement. The valve 98 is slidable or movable toward either end of the housing 100 from said neutral position to admit fluid under pressure from the groove 102 to one of the outlet passages 108 or 110 and to vent the other of said passages.

In order to move the servo-valve 98, a pair of solenoids 120 and 122 are mounted at opposite ends of the valve housing 100. The valve 98 is provided with extensions 124 and 126 at its opposite ends which function as plungers for the adjacent solenoids whereby upon energization of either of said solenoids, its plunger 124 or 126 is drawn into said solenoid thereby moving the valve 98 toward said solenoid end of the housing 100.

Energization of the solenoids 120 and 122 is controlled by an elastic diaphragm 128. The diaphragm 128 divides a housing 130 into a pair of opposed chambers 132 and 134. A conduit 136 connects the chamber 132 to the surrounding atmosphere so that the pressure in said chamber is equal to the static pressure of the surrounding atmosphere. A conduit 138 connects the chamber 134 to the divergent or downstream portion of the nozzle passage at a point 140 adjacent to the discharge opening of said nozzle so as to subject the chamber 134 to the static nozzle pressure at the point 140.

The diaphragm 128 has a central electric contact 142 connected to a source of electric energy 144 through a switch 146. The diaphragm 128 is urged by the pressure in the chamber 134 in a direction to move its contact 142 into engagement with a contact 148 and is urged by the pressure in the chamber 132 in the opposite direction to move its contact 142 into engagement with a contact 150. When the pressure in the chamber 132 is equal to that of the chamber 134 the elasticity of the diaphragm moves the diaphragm to its neutral position (as illustrated) in which position its contact 142 is spaced from the contacts 148 and 150. The contact 148 is connected to one side of the solenoid 122 and the source of electric energy 144 is connected to the other side of the solenoid 122. The contact 150 is connected to one side of the solenoid 120 and the source of electric energy 144 is connected to the other side of said solenoid 120.

With this control mechanism for the motor 86, when the nozzle pressure at the point 140 is equal to that of the surrounding atmosphere then the fluid pressures in the chambers 132 and 134 are equal so that both solenoids 120 and 124 are de-energized and the springs 116 and 118 center the valve 98 in the position illustrated whereupon the motor 86 and the nozzle plates 32 and 34 connected thereto are hydraulically locked in position. If, however the exhaust nozzle pressure at the point 140 should become higher than that of the surrounding atmosphere, as a result of a relative change in the magnitudes of said pressures, then the high pressure in the chamber 134 will cause the diaphragm contact 142 to move into engagement with the contact 148 thereby energizing the solenoid 122 (assuming the switch 146 to be closed). Energization of the solenoid 122 causes the valve 98 to move to vent the passage 108 and to place the passage 110 into communication with the pressure supply passage 104. The piston 88 thereupon moves to the left (Fig. 1) to move the nozzle plates 32 and 34 to increase the area of the discharge opening of the nozzle until the nozzle pressure at the point 140 drops to that of the surrounding atmosphere whereupon the elasticity of the diaphragm 128 moves the diaphragm back to its neutral position thereby disengaging the contacts 142 and 148 and therefore, de-energizing the solenoid 122. The springs 118 then return the servo-valve 98 to its neutral position thereby stopping further movement of the nozzle plates 32 and 34. Similarly, if the exhaust nozzle pressure at the point 140 should become lower than that of the surrounding atmosphere, as a result of a relative change in the magnitude of said pressures, then contacts 142 and 150 will engage to energize the solenoid 120. Thereupon the valve 98 is moved to the left (Fig. 1) to vent the passage 110 and connect the passage 108 to the fluid pressure supply. The motor 86 then moves nozzle plates 32 and 34 to decrease the area of the nozzle discharge opening until the nozzle pressure at the point 140 again is equal to the pressure of the surrounding atmosphere. When this occurs, the diaphragm 128 returns to its neutral position breaking the contacts 142 and 150 and de-energizing the solenoid 120 thereby stopping the motor 86. Thus, the motor 86, under control of the diaphragm 128, automatically operates to position the nozzle plates 32 and 34 so that the nozzle pressure at the point 140 equal to that of the surrounding atmosphere.

As previously stated, the forward thrust force of the engine exhaust gases on the divergent nozzle is a maximum if the nozzle exit area is adjusted so that the pressure of the nozzle exhaust gases at the nozzle exit is equal to that of the surrounding atmosphere. For this purpose, the point 140 should be located close to the nozzle exit. It should be noted, however, that it may not be desirable to dispose the point 140 at the extreme exit end of the nozzle because the pressure at said extreme end may be influenced by pressure conditions outside the nozzle exhaust jet. If the point 140 is spaced upstream under the nozzle exit (as illustrated) then the motor 86, under control of the diaphragm 128, will automatically position the nozzle plates 32 and 34 so that the nozzle exhaust expands to a pressure somewhat below that of the surrounding atmosphere. Expansion of the nozzle exhaust below atmospheric pressure is herein termed "over expansion." However, since the nozzle exhaust pressure falls off relatively slowly adjacent to the nozzle exit, so long as the point 140 is not spaced too far from the nozzle exit the nozzle pressure at the nozzle exit will be maintained approximately equal to, although somewhat below, that of the surrounding atmosphere. Furthermore, since over expansion of the nozzle exhaust is produced by opening the nozzle exit beyond that required for expansion of the nozzle exhaust down to atmospheric pressure at the nozzle exit, some or even appreciable over expansion may be desirable because the increase in the nozzle exit area required to produce said over expansion reduces the projected drag area of the engine housing.

It should be noted that the above discussion of the nozzle operation assumes that the nozzle exhaust gas flow is supersonic through the divergent nozzle portion, that is through the nozzle portion bounded by the nozzle plates 32 and 34.

As in the case of the motor 70, for reasons of symmetry two motors 86 are preferably provided on opposite sides of the duct 12.

As stated, with the point 140 spaced upstream from the nozzle discharge end, the nozzle pressure at its discharge end will be less than the nozzle pressure at said point. If this pressure difference is considered to be too large, it may be at least partially compensated for by the addition of a bias force against the control diaphragm, as illustrated in Fig. 4.

Figure 2:
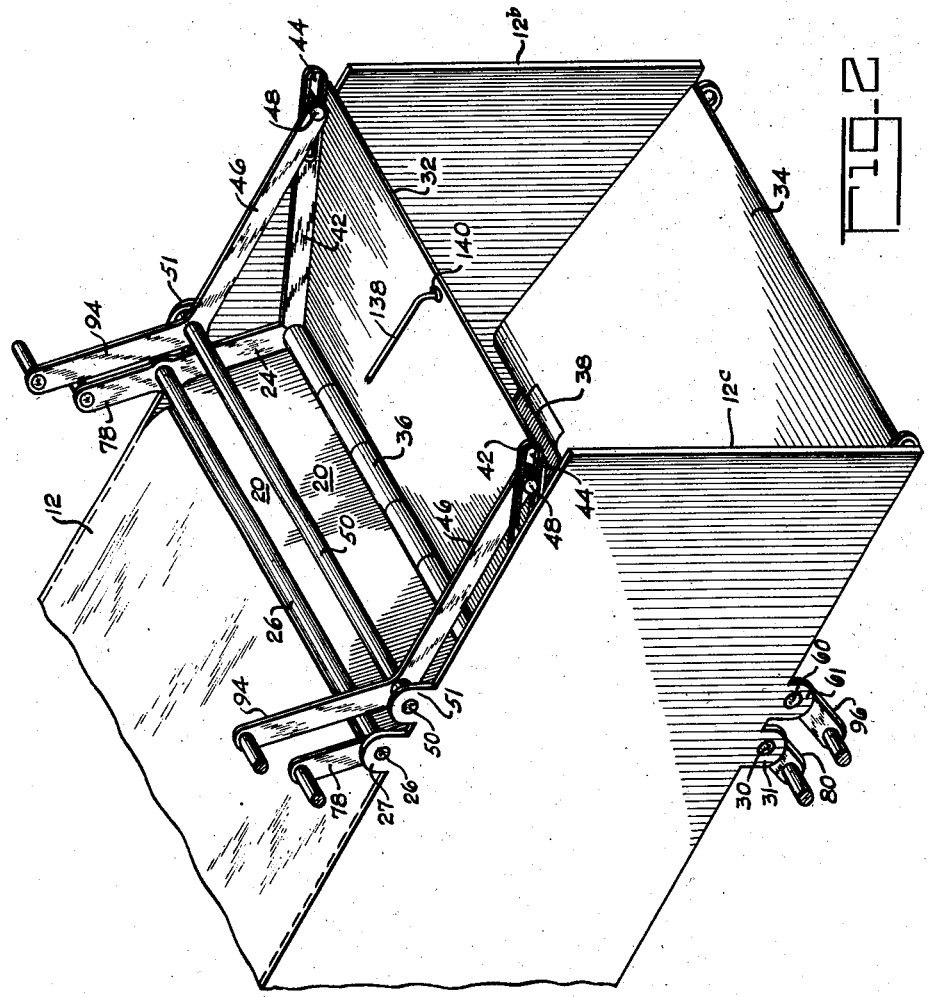
Fig. 2 is a schematic perspective view of the variable area nozzle of Fig. 1.
Figure 3:
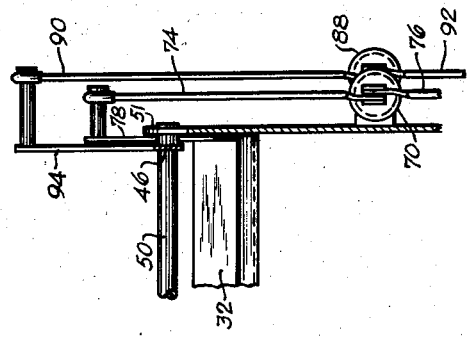
Fig. 3 is a view taken along the line 3—3 of Fig. 1.
Figure 4:
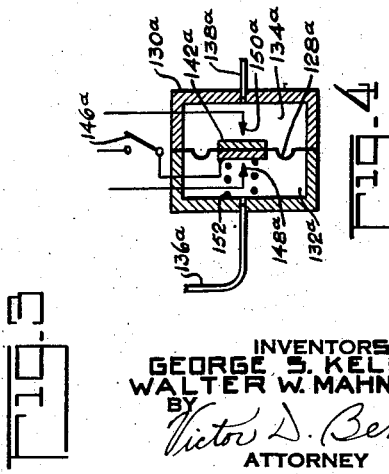
Fig. 4 is a partial view of a modification of Fig. 1.

Except for the addition of a bias spring the modification of Fig. 4 is like that of Fig. 1. Accordingly the parts of Fig. 4 have been designated by the same reference numerals, but with a subscript $a$ added thereto as the corresponding parts of Fig. 1. In Fig. 4, a spring 152 acts against the control diaphragm 128$a$ in the same direction as the atmospheric pressure in the chamber 132$a$. Because of the spring 152, the diaphragm 128$a$ and associated control mechanism will control the nozzle discharge opening of the nozzle so that the pressure in the chamber 134$a$, and therefore the nozzle pressure at the point 140, is maintained above atmospheric pressure by an amount dependent on the force exerted by the spring 152.

The invention has been described in connection with a nozzle of rectangular cross-section. Obviously, however, the invention could be applied to nozzles of other cross-section, for example to a nozzle of circular or substantially circular cross-section as illustrated in Figs. 5 and 6.

In Figs. 5–6 there is illustrated a jet engine exhaust duct 200 having a substantially circular nozzle 202 at its rear or discharge end. The nozzle 202 comprises a plurality of circumferentially-spaced pairs of nozzle plates 204 and 206. The plates 204 form the upstream or converging nozzle portion and the plates 206 form the downstream or diverging nozzle portion. Each pair of plates 204 and 206 is hingedly connected together at 208 to form the nozzle throat. Each plate 206 has an offset portion 210 overlapping one of the adjacent plates 206 to close the gap therebetween. The plates 204 may have a similar overlapping construction not shown. Each nozzle plate 204 has a fixed pivotal connection with the duct 200. Each nozzle plate 206 has a slot at its downstream end within which a pin of a lever 212 is received whereby each plate 206 and its lever 212 are slidingly and pivotally connected together. Each lever 212 has a fixed pivotal support and is connected by a link 214 to an axially movable ring 216 surrounding the duct 200. Each upstream nozzle plate 204 has an extension 218 which is connected to a second axially movable ring 220 by a link 222. Obviously the cross-section of the nozzle 202 may be made to more nearly approximate or approach a circle by increasing the number of pairs of plates 204 and 206.

With this construction of Figs. 5 and 6 axial movement of the ring 220 in effective to simultaneously move the nozzle plates 204 to vary the area of the nozzle throat while axial movement of the ring 216 is effective to simultaneously move the nozzle plates 206 to vary the exit area of the nozzle independently of the nozzle throat. The ring 216 is operatively connected to motor means (not shown) equivalent to the motor 88 and associated control means of Fig. 1 so as to vary the exit area of the nozzle 202 to maintain the nozzle pressure at its discharge end approximately equal to that of the surrounding atmosphere.

While we have described our invention in detail in its present preferred embodiment, it will be obvious to those skilled in the art, after understanding our invention, that various changes and modifications may be made therein without departing from the spirit or scope thereof. We aim in the appended claim to cover all such modifications.

We claim as our invention:

In combination with a convergent-divergent variable area nozzle for a jet engine through which the engine exhaust gases discharge for providing the engine with forward propulsive thrust, said nozzle having an upstream portion and a downstream portion pivotally connected together at the nozzle throat with said downstream nozzle portion progressively increasing in cross-sectional area to the nozzle exit end; means pivotally supporting the upstream end of said upstream portion; means operatively connected to said upstream nozzle portion and operable to swing said portion about its pivotal support for varying the throat area of the nozzle; means operatively connected to said downstream nozzle portion and operable to swing said downstream portion about its piovtal connection with and independently of said upstream portion for varying the divergence of said downstream nozzle portion thereby varying the exit area of the nozzle independently of the nozzle throat area; means providing a first signal which is a measure of the exhaust gas static pressure in the downstream nozzle portion adjacent to the nozzle exit; means providing a second signal which is a measure of the static pressure of the surrounding atmosphere; and means automatically operable in response to said first and second signals for controlling the operation of said nozzle exit area varying means for expansion of the engine exhaust gases through the downstream portion of the nozzle at least down to approximately the static pressure of the surrounding atmosphere.

References Cited in the file of this patent

UNITED STATES PATENTS

| | | |
|---|---|---|
| 1,095,767 | Adams | May 5, 1914 |
| 2,411,895 | Poole | Dec. 3, 1946 |
| 2,537,772 | Lindquist et al. | Jan. 9, 1951 |
| 2,546,673 | Mattix et al. | Mar. 27, 1951 |
| 2,551,372 | Haltenberger | May 1, 1951 |
| 2,563,270 | Price | Aug. 7, 1951 |
| 2,566,961 | Poole | Sept. 4, 1951 |
| 2,569,996 | Kollsman | Oct. 2, 1951 |
| 2,570,629 | Anxionnaz et al. | Oct. 9, 1951 |
| 2,580,962 | Sédille | Jan. 1, 1952 |
| 2,603,062 | Weiler et al. | July 15, 1952 |
| 2,625,008 | Crook | Jan. 13, 1953 |
| 2,663,140 | Price | Dec. 22, 1953 |

OTHER REFERENCES

Jet Aircraft Power Systems, J. V. Casamassa, published by McGraw-Hill Book Company (1950), page 107.